United States Patent [19]

Candelaria et al.

[11] Patent Number: 5,426,758
[45] Date of Patent: Jun. 20, 1995

[54] METHOD AND SYSTEM FOR ACESSING DATA FROM A MULTI-HEAD DATA PROCESSING SYSTEM UTILIZING A TRANSDUCER HEAD SWITCHING TABLE

[75] Inventors: Susan K. Candelaria; Dean L. Hanson, both of Tucson, Ariz.; Robert L. Kwok, San Jose, Calif.; Kenneth W. Lane, Tucson, Ariz.; Donald M. Nordahl, Tucson, Ariz.; Mark A. Reid; William G. Sherman, II, both of Tucson, Ariz.

[73] Assignee: International Business Machines Corporation, Armonk, N.Y.

[21] Appl. No.: 949,672

[22] Filed: Sep. 23, 1992

[51] Int. Cl.⁶ .................... G06F 12/00; G11B 5/55
[52] U.S. Cl. .................... 395/425; 395/275; 395/400; 364/DIG. 1; 360/72.1; 360/78.01; 369/30; 369/98
[58] Field of Search ............ 395/425, 400, 275; 360/39, 72.1, 75, 78.01; 369/30, 98, 178

[56] References Cited

U.S. PATENT DOCUMENTS

| | | | |
|---|---|---|---|
| 4,237,497 | 12/1980 | Trevithick | 360/72.1 |
| 4,577,240 | 3/1986 | Hedberg et al. | 360/98 |
| 4,882,671 | 11/1989 | Graham et al. | 395/275 |
| 5,155,814 | 10/1992 | Beardsley et al. | 395/275 |
| 5,157,770 | 10/1992 | Beardsley et al. | 395/275 |
| 5,235,692 | 8/1993 | Ayres et al. | 395/425 |
| 5,255,136 | 10/1993 | Machado et al. | 360/75 |

*Primary Examiner*—Glenn Gossage
*Attorney, Agent, or Firm*—H. St. Julian; Andrew J. Dillon

[57] ABSTRACT

A method and system for enhancing the efficiency of data accessing within a storage subsystem which is coupled to a host system via a storage subsystem controller and a data channel. The storage subsystem controller preferably includes a tracked cyclic storage device which has multiple disks which are rotatable about a single spindle. Recording tracks within each disk are then accessed utilizing multiple switchable transducer heads. A signal transmitted from the host system is utilized to define a sequence in which a group of recording tracks are to be accessed. That signal is then utilized to create a transducer head switching table within the storage subsystem controller which lists each recording track to be accessed and an associated control parameter for selecting a particular transducer head to be utilized to access a subsequent recording track. Each time the end of an accessed recording track is encountered, the transducer head switching table is accessed and the control parameter associated with that track is accessed and coupled to the tracked cyclic storage device transducer head switch in order to select a subsequent recording track for access. In this manner, a plurality of tracks may be accessed in any desired order. A pointer is established into the transducer head switching table at the listing of an initially accessed recording track and access may be terminated when that pointer is encountered.

11 Claims, 3 Drawing Sheets

| TRACK # | NEXT HEAD CONTROL PARAMETER |
|---|---|
| 01 | GOTO 02 |
| 02 | GOTO 06 |
| 03 | GOTO 09 |
| 04 | GOTO 05 |
| 05 | GOTO 10 |
| 06 | GOTO 03 |
| 07 | GOTO 15 |
| 08 | GOTO 11 |
| 09 | GOTO 08 |
| 10 | GOTO 07 |
| 11 | GOTO 04 |
| 12 | GOTO 14 |
| 13 | GOTO 01 |
| 14 | GOTO 13 |
| 15 | GOTO 12 |

*Fig. 2*

METHOD AND SYSTEM FOR ACESSING DATA FROM A MULTI-HEAD DATA PROCESSING SYSTEM UTILIZING A TRANSDUCER HEAD SWITCHING TABLE

BACKGROUND OF THE INVENTION

1. Technical Field

The present invention relates in general to enhanced efficiency of data access in a data processing system and in particular to a method and system for automated transducer head switching in a data storage subsystem within a data processing system. Still more particularly, the present invention relates to a method and system which permit automated transducer head switching in any selected order in a data storage subsystem.

2. Description of the Related Art

Data processing systems frequently include large scale storage devices such as direct access storage devices (DASD) which are located externally to the host computer system and sometimes located at significant distances therefrom. Communication from the host computer system to the DASD is accomplished over signal cables referred to as data channels which extend between the DASD and its control unit and connect the DASD units to the host computer system.

Current technology provides DASD units with several separate disks, all rotatable about the same spindle. These disks or platters are then accessed by head disk assemblies with a transducing head providing access to one surface of each disk. There may be, for example, nine platters in a disk drive providing sixteen usable surfaces with one of the usable surfaces used for maintaining accurate tracking capability. In such units there are thus fifteen usable surfaces for data and when all heads are positioned, a cylinder of fifteen physical, recording tracks may be accessed.

DASD units frequently use a so-called "Count-Key-Data" architecture (CKD) wherein records which are written on a track are provided with a count field (an identification), a key field and a data field. In writing these fields along a recording track, a gap is provided between each of the fields. These gaps are sometimes utilized to provide a time period during which the DASD control unit and the host computer system data channel may communicate with each other. It is during this gap time that the storage system control unit provides information back to the channel in response to the command which has been received and obtains the next command in order to begin the next operation for searching, retrieving or writing records. In a synchronous system the particular record upon which the DASD unit is working is the same record on which the channel has requested work, so that both the data channel and the DASD unit are synchronous with each other in the sense that they are both working on the same record, either to read that record or to write it.

As data processing systems become faster and faster, the delays created by gaps or by the performance of functions within a gap period must be minimized to the extent that these functions can be performed within such gaps. This is particularly true of optical fiber channels, such as the ESCON (or Enterprise System Connection) fiber optic channel manufactured by International Business Machines Corporation of Armonk, N.Y.

One manner in which these functions may be eliminated to enhance the efficiency of data storage subsystems is the so-called "roll" mode of operation in which processing begins with the first record encountered on a particular recording track. Thereafter, when the end of the track is encountered, the operations "rolls" to the beginning of the recording track and continues. In this manner, all records on a particular track may be accessed within a tracked cyclic storage device without requiring the transmission of control signals between the storage subsystem controller and the direct access storage device.

A natural extension of this technique is a roll mode operation over multiple tracks. U.S. patent application Ser. No. 07/575,741, filed Aug. 31, 1990, entitled "Non-Synchronous DASD Control," now U.S. Pat. No. 5,157,770 which is assigned to the assignee herein, describes a system which permits channel programs to describe the nature and scope of a data transfer before the first data transfer command is executed. This is accomplished utilizing a bitmap which includes a plurality of bits, each bit corresponding to a particular track within a tracked cyclic storage device. By altering the value of the bit at each place within the bitmap, a plurality of recording tracks may be accessed by sequentially enabling only those heads associated with the selected recording tracks. However, this technique, while a substantial advance over the prior art, requires the translation of this bitmap into the relevant control parameter for selecting a particular transducer head and the subsequent transmission of that control parameter to the tracked cyclic storage device. Additionally, the utilization of a sequential series of digital bits to control the switching of transducer heads requires that the transducer heads be selected in either ascending or descending numerical order, without permitting variation of that order.

In a modem data processing storage subsystem, the accessing of multiple recording tracks within a tracked cyclic storage device by switching the transducer heads must also be accomplished as rapidly as possible in order to minimize the amount of overhead associated with these control signals. Further, those skilled in the art will appreciate that it would be desirable to implement a data storage subsystem which permits multiple tracks within a tracked cyclic storage device to be automatically accessed in any desired order.

SUMMARY OF THE INVENTION

It is therefore one object of the present invention to provide an enhanced efficiency of data access in a storage subsystem within a data processing system.

It is another object of the present invention to provide a method and system for automated transducer head switching in a data storage subsystem.

It is yet another object of the present invention to provide an improved method and system for permitting automated transducer head switching in any selected order in a data storage subsystem.

The foregoing objects are achieved as is now described. A method and system are disclosed for enhancing the efficiency of data accessing within a storage subsystem which is coupled to a host system via a storage subsystem controller and a data channel. The storage subsystem controller preferably includes a tracked cyclic storage device which has multiple disks which are rotatable about a single spindle. Recording tracks within each disk are then accessed utilizing multiple switchable transducer heads. A signal transmitted from the host system is utilized to define a sequence in which a group of recording tracks are to be accessed. That signal is then utilized to create a transducer head switching table within the storage subsystem controller which lists each recording track to be accessed and an associated control parameter for selecting a particular transducer head to be utilized to access a subsequent recording track. Each time the end of an accessed recording track is encountered, the transducer head switching table is accessed and the control parameter associated with that track is accessed and coupled to the tracked cyclic storage device transducer head switch, in order to select a subsequent recording track for access. A pointer is established into the transducer head switching table at the listing of an initially accessed recording track and access may be terminated when that pointer is encountered.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a pictorial representation of a transducer head switching table which may be utilized to implement the method and system of the present invention;

DETAILED DESCRIPTION OF PREFERRED EMBODIMENT

Figure 1:
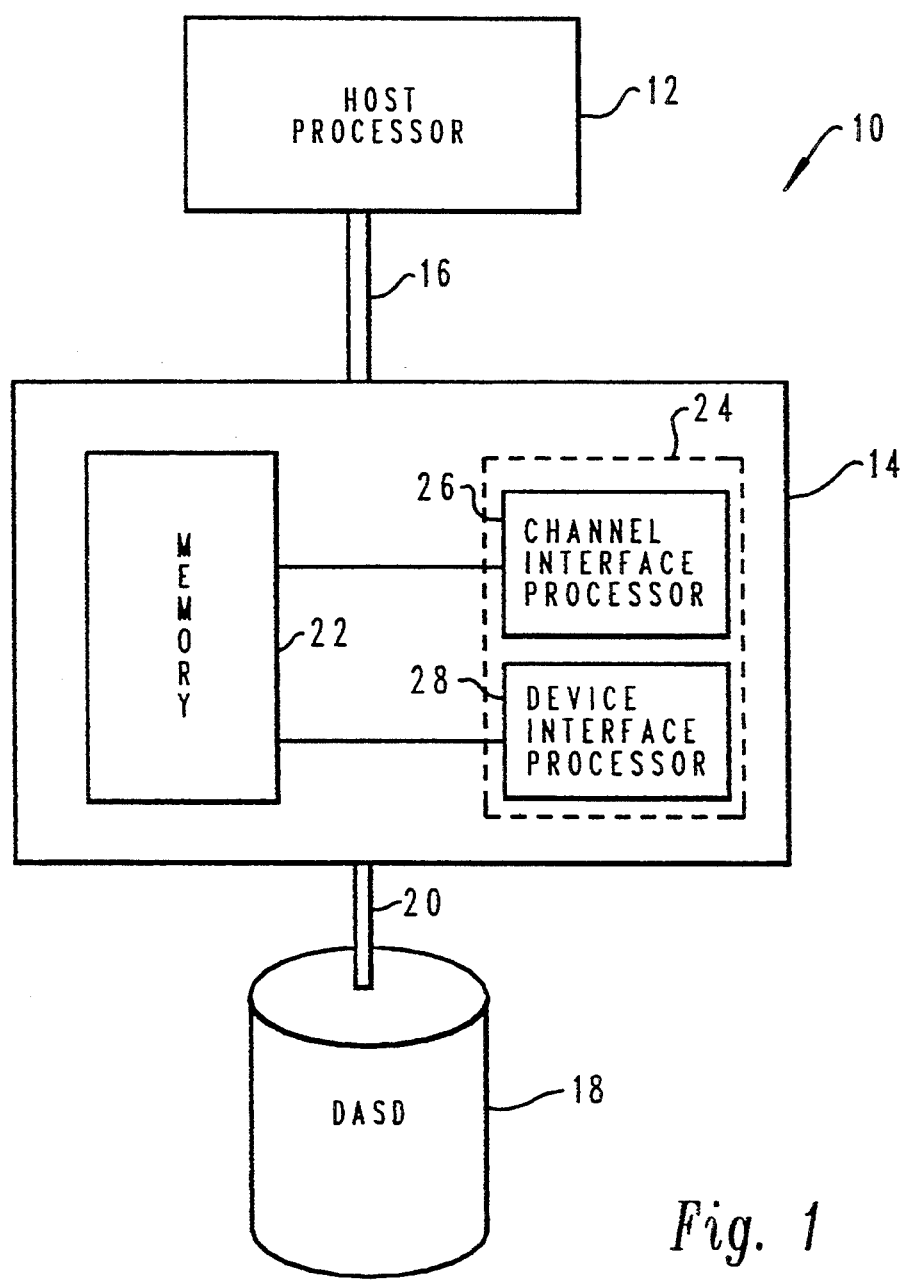
FIG. 1 is a simplified block diagram of a data processing system which may be utilized to implement the method and system of the present invention.

With reference now to the figures and in particular with reference to FIG. 1, there is depicted a simplified block diagram of a data processing system 10 which may be utilized to implement the method and system of the present invention. As illustrated, data processing system 10 includes a host processor 12 which is a coupled via a data channel 16 to a storage subsystem control unit 14. Storage subsystem control unit 14 and direct access storage device (DASD) 18 comprise a peripheral data processing subsystem which may be utilized for managing storage activities on DASD 18.

Those skilled in the art will appreciate that FIG. 1 is substantially simplified. For example, data channel 16 may actually comprise multiple data channels coupled to storage subsystem control unit 14. A state-of-the-art peripheral data processing subsystem of this type typically includes sixteen data channels which are coupled to a single storage subsystem control unit. As a result, up to sixteen host processors may be coupled to a single storage subsystem control unit, although redundancy requirements generally limit the number of host processors.

Typically, a single subsystem control unit may also be connected to up to sixty-four direct access storage devices. However, for purposes of explanation within the present specification, it is irrelevant how many channels or how many direct access storage devices are coupled to the control unit and therefore the simplified block diagram of FIG. 1 is sufficient for explaining the present invention.

Storage subsystem control unit 14 typically contains all of those electronic circuits, microprocessors and microcode which are required to manage data transfer between direct access storage device (DASD) 18 and host processor 12. Such devices are well known and only a portion of the circuitry typically contained within a storage subsystem control unit is illustrated within FIG. 1. FIG. 1 includes a depiction of storage subsystem controller memory 22 and control circuitry 24 which preferably includes channel interface processor 26 (CHIP) and device interface processor 28 (DIP). As illustrated, channel interface processor 26 and device interface processor 28 both typically have access to storage subsystem controller memory 22 and may also have access to other storage areas within storage subsystem controller 14, such as cache storage (not depicted).

Upon reference to the foregoing those skilled in the art will appreciate that channel interface processor 26 and device interface processor 28 may be separate processors or may be implemented as separate processes operating within control circuitry 24. Implementation as a separate processor or a separate microcode module within the same processor is a simple matter of design choice dictated primarily by speed and cost considerations.

Referring now to FIG. 2, there is depicted a pictorial representation of a transducer head switching table 30 which may be utilized to implement the method and system of the present invention. As illustrated, transducer head switching table 30 preferably includes two columns. Column 32 is utilized as an entry to access transducer head switching table 30 and lists each track within a particular access operation. For purposes of illustration, each cylinder within DASD 18 of FIG. 1 is presumed to include fifteen tracks. For simplicity of explanation these tracks are listed in numerical order within column 32 as tracks 01 through track 15.

As will be explained in greater detail herein, transducer head switching table 30 is preferably dynamically created within storage subsystem controller 14 in response to the receipt by storage subsystem controller 14 of a Locate Record Extended (LRE) command from host processor 12 through data channel 16. The Locate Record Extended (LRE) command is utilized to specify a plurality of tracks which are to be accessed within DASD 18 by storage subsystem controller 14. For purposes of the illustration contained within FIG. 2, it has been assumed that all fifteen tracks within that cylinder are to be accessed; however, those skilled in the art will appreciate that the method and system of the present invention will find application in any multi-track access operation.

Transducer head switching table 30 preferably includes a second column, NEXT HEAD CONTROL PARAMETER, column 34. Listed within column 34 is the control parameter which may be utilized to switch transducer heads within DASD 18 upon the encountering of the end of a currently accessed track. Thus, for example, if track 01 is initially accessed, upon the encountering of the end of track 01 the NEXT HEAD CONTROL PARAMETER "GOTO 02" is associated with track 01 within the table. This parameter may take the form of any representation suitable for controlling the switching of transducer heads within a DASD unit and is preferably in a form which may be coupled directly to the DASD unit without requiring translation and the concomitant delay associated therewith. Thus, as illustrated within FIG. 2, upon the encountering of the end of track 01, transducer head switching table 30 will be accessed and the transducer heads within DASD 18 will be controlled by the NEXT HEAD CONTROL PARAMETER associated with track 01 within the table.

For simplicity of explanation, the transducer head numbers within DASD 18 are sequentially numbered from one to fifteen and correspond directly to the track numbers listed within the table. In this manner, after completing the accessing of track 01 is completed, track 02 will be accessed next. Still referring to FIG. 2, when the end of track 02 is encountered, the NEXT HEAD CONTROL PARAMETER associated therewith within transducer head switching table 30 is "GOTO 06," indicating that track 06 is the next track to be accessed. Upon reference to the transducer head switching table illustrated within FIG. 2, those skilled in the art will appreciate that by storing the control parameter utilized to select the transducer head which will be utilized to access the next recording track within DASD 18, the process by which the transducer head is switched is rendered substantially more efficient and may be accomplished in a much more rapid manner. Additionally, by storing an actual control parameter the tracks within a particular cylinder within DASD 18 may be accessed in any selected order, without requiring the system to sequentially step through the transducer heads in an ascending or descending order, as prior art systems require.

Still referring to FIG. 2, another important feature of the present invention is illustrated. Upon commencing the accessing of the tracks listed within transducer head switching table 30 at track 01, a pointer 36 is established. Pointer 36 is utilized to demark the initially accessed track and upon the completion of accessing each track listed therein and a return to track 01, the accessing of recording tracks within DASD 18 may be automatically terminated. That is, upon the accessing of track 13, the table may be utilized to access the NEXT HEAD CONTROL PARAMETER associated with track 13. This NEXT HEAD CONTROL PARAMETER is "GOTO 01," returning the process to the track which was initially accessed. Upon encountering pointer 36 the accessing of recording tracks for this particular access operation will cease. Of course, those skilled in the art will appreciate that alternate methods may be utilized to signify the beginning and ending of an access operation.

Figure 3:
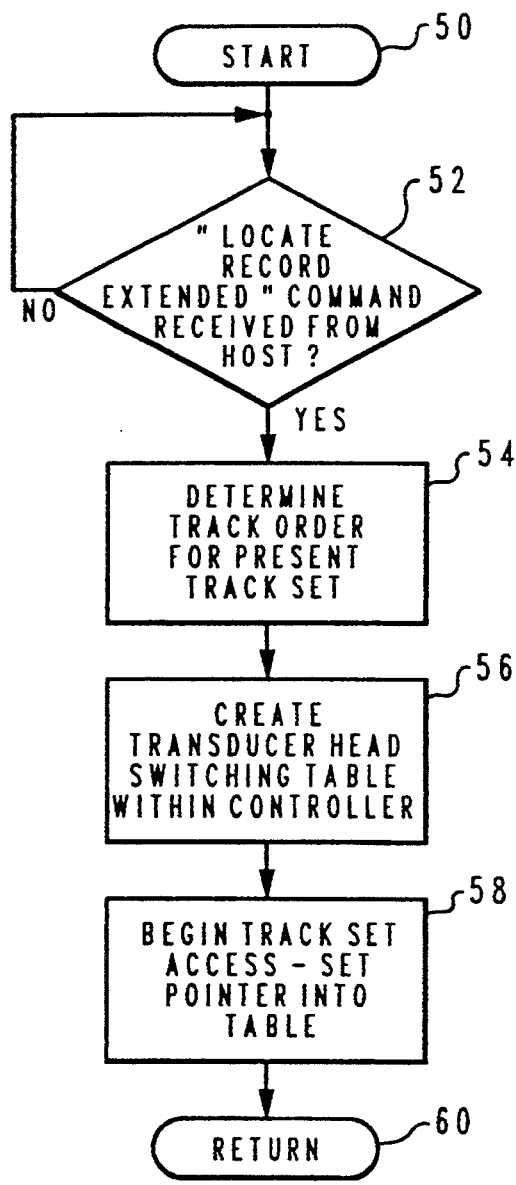
FIG. 3 is a high level logic flowchart illustrating the creation of the transducer head switching table of FIG. 2 in accordance with the method and system of the present invention.

With reference now to FIG. 3, there is depicted a high level logic flowchart which illustrates the creation of transducer head switching table 30 of FIG. 2. As illustrated, the process begins at block 50 and thereafter passes to block 52. Block 52 depicts a determination of whether or not a "LOCATE RECORD EXTENDED" command has been received from host processor 12 via data channel 16. If not, the process merely iterates until such time as such a command is received.

Still referring to block 52, in the event a "LOCATE RECORD EXTENDED" command has been received from host processor 12, the process passes to block 54. Block 54 illustrates a determination of the track order for accessing the present track set, which is specified by host processor 12. The process then passes to block 56 which illustrates the creation of transducer head switching table 30 within controller 14, as depicted within FIG. 2. Next, the process passes to block 58. Block 58 illustrates the beginning of the track set access and the setting of a pointer, such as pointer 36 (see FIG. 2) into the transducer head switching table. Those skilled in this art will appreciate that this type of access may be utilized to read from or write to a selected track set. The transducer head switching table creation process then returns, as depicted at block 60.

Figure 4:
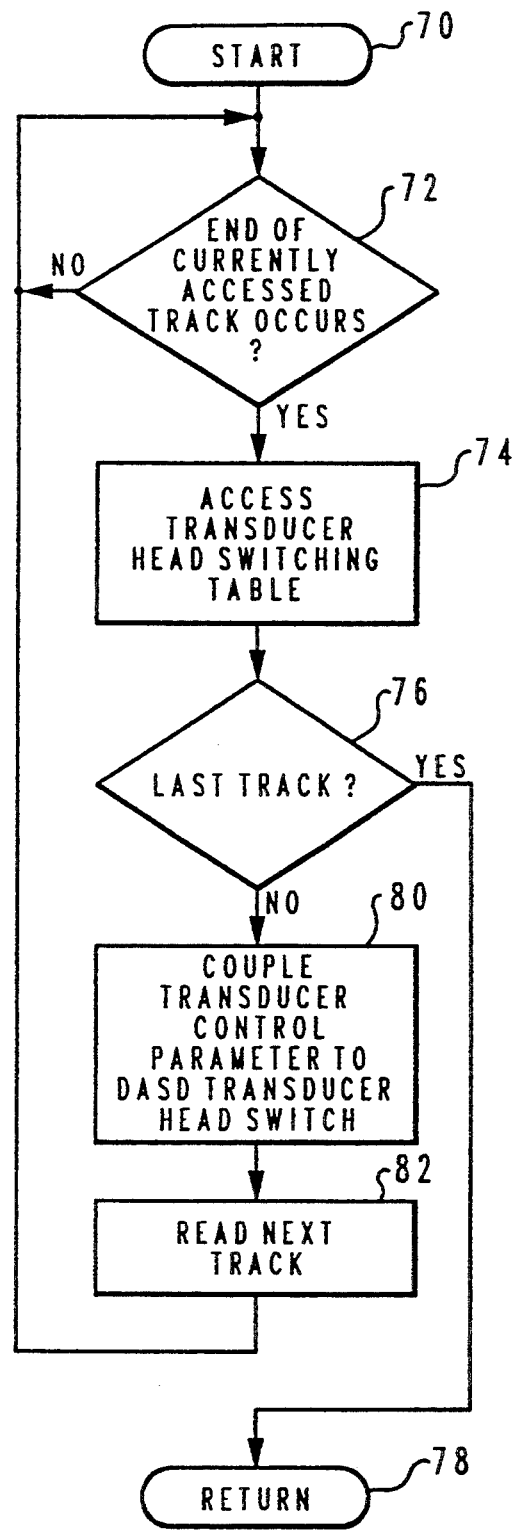
FIG. 4 is a high level logic flowchart illustrating automated transducer head switching utilizing the transducer head switching table of FIG. 2, in accordance with the method and system of the present invention.

Finally, with reference to FIG. 4, there is depicted a high level logic flowchart which illustrates automated transducer head switching utilizing transducer head switching table 30 of FIG. 2, in accordance with the method and system of the present invention. As above, this process begins at block 70 and thereafter passes to block 72. Block 72 illustrates the determination of whether the end of a currently accessed track has occurred. If not, the process merely iterates until such time as the end of a currently accessed track is encountered. Once the end of a currently accessed track has been encountered, the process passes to block 74. Block 74 illustrates the accessing of transducer head switching table 30, which has been created in accordance with the process described with respect to FIG. 3. Upon accessing transducer head switching table 30, a determination is made, as illustrated in block 76, as to whether or not the track previously accessed is the last track within the current track set. If so, the process passes to block 78 and returns.

However, in the event the previously accessed track is not the last track within the current track set, as determined within block 76, the process passes to block 80. Block 80 illustrates the coupling of the transducer control parameter associated with the most recently accessed track to the DASD unit transducer head switch. This, as those skilled in the art will appreciate, causes the automatic switching to the appropriate transducer head in order to access the next recording track to be selected. Block 82 illustrates the reading of that track and the process then returns to block 72 to await the encountering of the end of that track.

Upon reference to the foregoing those skilled in the art will appreciate that the applicants herein have created a method and system for automated transducer head switching which permits the transducer heads within a direct access storage device to be selected in any desired order and in a rapid and efficient manner, without requiring substantial overhead for control circuitry or processing.

While the invention has been particularly shown and described with reference to a preferred embodiment, it will be understood by those skilled in the art that various changes in form and detail may be made therein without departing from the spirit and scope of the invention.

We claim:

1. A method in a data processing system for enhancing the efficiency of data accessing from a storage subsystem which is coupled to a host system via a storage subsystem controller and a data channel, said storage subsystem including a tracked cyclic storage device having a plurality of disks rotatable about a single spindle and multiple transducer heads for providing access to recording tracks on each disk, said method comprising the steps of:
- transmitting a signal from said host system to said storage subsystem via said storage subsystem controller and said data channel, said signal defining a sequence in which recording tracks within said tracked cyclic storage device are to be accessed;
- dynamically creating a transducer head switching table in response to receipt of said signal at said storage subsystem controller, said transducer head switching table including a listing of each recording track to be accessed and an associated control parameter for selecting a particular transducer head to be utilized to access a subsequent recording track;
- accessing a recording track within said tracked cyclic storage device utilizing a selected one of said multiple transducer heads; and
- accessing said transducer head switching table in response to encountering an end of an accessed recording track and directly coupling the associated control parameter to a transducer head switch within said tracked cyclic storage device wherein a plurality of recording tracks may be automatically accessed in any desired order.

2. The method according to claim 1, wherein said storage subsystem controller includes a memory and wherein said step of dynamically creating a transducer head switching table in response to receipt of said signal at said storage subsystem controller comprises the step of dynamically creating a transducer head switching table within the storage subsystem controller memory including a listing of each recording track to be accessed and an associated control parameter for selecting a particular transducer head to be utilized to access a subsequent recording track.

3. The method according to claim 1, further including the step of reading data within each accessed recording track within said tracked cyclic storage device.

4. The method according to claim 1, further including the step of writing data within each accessed recording track within said tracked cyclic storage device.

5. The method according to claim 1, further including the step of terminating access to any of said recording tracks in response to a successful accessing of all recording tracks listed within said transducer head switching table.

6. The method according to claim 1, further including the step of establishing a pointer into said transducer head switching table at a listing of an initially accessed recording track.

7. The method according to claim 6, further including the step of terminating access to any of said recording tracks in response to encountering said pointer within said transducer head switching table.

8. A data processing system for enhancing the efficiency of data accessing from a storage subsystem which is coupled to a host system via a storage subsystem controller and a data channel, said storage subsystem including a tracked cyclic storage device having a plurality of disks rotatable about a single spindle and multiple transducer heads for providing access to recording tracks on each disk, said data processing system comprising:
- means for transmitting a signal from said host system to said storage subsystem via said storage subsystem controller and said data channel, said signal defining a sequence in which recording tracks within said tracked cyclic storage device are to be accessed;
- means for dynamically creating a transducer head switching table in response to receipt of said signal at said storage subsystem controller, said transducer head switching table including a listing of each recording track to be accessed and an associated control parameter for selecting a particular transducer head to be utilized to access a subsequent recording track;
- means for accessing a recording track within said tracked cyclic storage device utilizing a selected one of said multiple transducer heads; and
- means for accessing said transducer head switching table in response to encountering an end of an accessed recording track and directly coupling the associated control parameter to a transducer head switch within said tracked cyclic storage device wherein a plurality of recording tracks may be automatically accessed in any desired order.

9. The data processing system according to claim 8, wherein said storage subsystem controller includes a memory and wherein said means for dynamically creating a transducer head switching table in response to receipt of said signal at said storage subsystem controller comprises means for dynamically creating a transducer head switching table within the storage subsystem controller memory including a listing of each recording track to be accessed and an associated control parameter for selecting a particular transducer head to be utilized to access a subsequent recording track.

10. The data processing system according to claim 8, further including means for establishing a pointer into said transducer head switching table at a listing of an initially accessed recording track.

11. The data processing system according to claim 10, further including means for terminating access to any of said recording tracks in response to encountering said pointer within said transducer head switching table.

* * * * *

UNITED STATES PATENT AND TRADEMARK OFFICE
CERTIFICATE OF CORRECTION

PATENT NO. : 5,426,758
DATED : June 20, 1995
INVENTOR(S) : Candelaria, et. al.

It is certified that error appears in the above-indentified patent and that said Letters Patent is hereby corrected as shown below:

Title page, item [54], in the title and col. 1, line 1, change "ACESSING" to --ACCESSING--.

Column 5, line 19, delete "completing".

Signed and Sealed this

Seventh Day of May, 1996

Attest:

BRUCE LEHMAN

Attesting Officer    *Commissioner of Patents and Trademarks*